United States Patent
Zhang et al.

(10) Patent No.: US 8,018,945 B2
(45) Date of Patent: Sep. 13, 2011

(54) METHOD AND APPARATUS FOR FORWARDING NON-CONSECUTIVE DATA BLOCKS IN ENHANCED UPLINK TRANSMISSIONS

(75) Inventors: Guodong Zhang, Farmingdale, NY (US); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1239 days.

(21) Appl. No.: 11/095,912

(22) Filed: Mar. 31, 2005

(65) Prior Publication Data

US 2005/0243831 A1  Nov. 3, 2005

Related U.S. Application Data

(60) Provisional application No. 60/566,588, filed on Apr. 29, 2004.

(51) Int. Cl.
*H04L 12/28* (2006.01)
(52) U.S. Cl. ........ 370/394; 370/335; 370/447; 370/328; 370/331; 370/329
(58) Field of Classification Search .................. 370/394, 370/328, 349, 412, 329, 395.4
See application file for complete search history.

(56) References Cited

U.S. PATENT DOCUMENTS

| | | | |
|---|---|---|---|
| 5,530,917 A | 6/1996 | Andersson et al. | |
| 5,838,668 A | 11/1998 | Okada et al. | |
| 5,884,171 A * | 3/1999 | Tanabe et al. | 455/434 |
| 5,970,062 A | 10/1999 | Bauchot | |
| 6,031,832 A | 2/2000 | Turina | |
| 6,088,335 A | 7/2000 | I et al. | |
| 6,236,656 B1 | 5/2001 | Westerberg et al. | |
| 6,463,096 B1 | 10/2002 | Raleigh et al. | |
| 6,469,992 B1 | 10/2002 | Schieder | |
| 6,567,388 B1 | 5/2003 | Tomcik et al. | |

(Continued)

FOREIGN PATENT DOCUMENTS

EP   0948154   10/1999

(Continued)

OTHER PUBLICATIONS

Third Generation Partnership Project, "Physical Layer Standard for cdma2000 Spread Spectrum Systems", $3^{rd}$ Generation Partnership Project 2 "3GPP2", 3GPP2 C.S0002-C, Version 2.0, Revision C, Jul. 23, 2004.

(Continued)

*Primary Examiner* — David Q Nguyen
(74) *Attorney, Agent, or Firm* — Volpe and Koenig, P.C.

(57) ABSTRACT

A method and apparatus for forwarding non-consecutive data blocks in enhanced uplink (EU) transmissions. A wireless transmit/receive unit (WTRU) and one or more Node-Bs include one or more automatic repeat request (ARQ)/hybrid-ARQ (H-ARQ) processes for supporting an enhanced dedicated channel (E-DCH). Data blocks transmitted by the WTRU are re-ordered in a re-ordering entity located in the Node-B(s) or a radio network controller (RNC). Once a missing data block is identified, a data forwarding timer in the Node-B(s) or RNC is initiated and subsequent WTRU transmissions are monitored to determine whether the missing data block has been discarded by the WTRU. Upon recognition of the discard of the missing data block, the non-consecutive data blocks are forwarded to higher layers.

8 Claims, 4 Drawing Sheets

U.S. PATENT DOCUMENTS

| | | | |
|---|---|---|---|
| 6,658,005 B2 | 12/2003 | Seidel et al. | |
| 6,693,910 B2 | 2/2004 | Chao | |
| 6,717,927 B2 | 4/2004 | Chao | |
| 6,901,063 B2 | 5/2005 | Vayanos et al. | |
| 7,376,879 B2 | 5/2008 | Terry et al. | |
| 7,392,452 B2 | 6/2008 | Terry et al. | |
| 7,430,206 B2 * | 9/2008 | Terry et al. | 370/394 |
| 7,724,749 B2 * | 5/2010 | Terry et al. | 370/395.4 |
| 2002/0009999 A1 | 1/2002 | Lee et al. | |
| 2002/0154612 A1 * | 10/2002 | Massie et al. | 370/329 |
| 2003/0101274 A1 * | 5/2003 | Yi et al. | 709/232 |
| 2003/0123403 A1 * | 7/2003 | Jiang | 370/328 |
| 2003/0123485 A1 | 7/2003 | Yi et al. | |
| 2003/0125056 A1 | 7/2003 | Jiang | |
| 2003/0131124 A1 * | 7/2003 | Yi et al. | 709/236 |
| 2003/0169741 A1 | 9/2003 | Torsner et al. | |
| 2003/0210669 A1 | 11/2003 | Vayanos et al. | |
| 2004/0120284 A1 * | 6/2004 | Terry et al. | 370/329 |
| 2004/0177307 A1 * | 9/2004 | Chao | 714/752 |
| 2006/0156184 A1 | 7/2006 | Kim et al. | |
| 2006/0227712 A1 * | 10/2006 | Cheng et al. | 370/235 |
| 2008/0253346 A1 | 10/2008 | Terry et al. | |

FOREIGN PATENT DOCUMENTS

| | | |
|---|---|---|
| EP | 1006689 | 6/2000 |
| EP | 1 033 849 | 9/2000 |
| EP | 1 315 326 | 5/2003 |
| EP | 1 318 632 | 6/2003 |
| EP | 1 326 388 | 7/2003 |
| EP | 1 398 897 | 3/2004 |
| JP | 63-226151 | 9/1988 |
| JP | 01-289341 | 11/1989 |
| JP | 06-077963 | 3/1994 |
| JP | 07-221789 | 8/1995 |
| JP | 10-117213 | 5/1998 |
| JP | 10-190738 | 7/1998 |
| JP | 11-032077 | 2/1999 |
| JP | 2001-235335 | 8/2001 |
| JP | 2001-258063 | 9/2001 |
| TW | 317058 | 10/1997 |
| WO | 0024153 | 4/2000 |
| WO | 0052873 | 9/2000 |
| WO | 01/91360 | 11/2001 |
| WO | 03/036844 | 5/2003 |
| WO | 2006/012376 | 2/2006 |

OTHER PUBLICATIONS

Third Generation Partnership Project, "Medium Access Control (MAC) Standard for cdma2000 Spread Spectrum Systems", $3^{rd}$ Generation Partnership Prokect 2 "3GPP2", 3GPP2 C.20003-C, Version 2.0, Release C, Aug. 2004.

Third Generation Partnership Project, "Signaling Link Access Control (LAC) Standard for cdma2000 Spread Spectrum Systems", $3^{rd}$ Generation Partnership Project 2 "3GPP2", 3GPP2 C.S0004-C, Version 2.0, Revision C, Jul. 23, 2004.

Third Generation Partnership Project, "Upper Layer (Layer 3) Signaling Standard for cdma2000 Spread Spectrum Systems", $3^{rd}$ Generation Partnership Project 2 "3GPP2", 3GPP2 C.S0005-C, Version 2.0, Revision c, Jul. 23, 2004.

3GPP2 C.S0002-C, "Physical Layer Standard for cdma2000 Spread Spectrum Systems", $3^{rd}$ Generation Partnership Project 2 "3GPP2", Version 2.0, Revision C, Jul. 23, 2004.

3GPP2 C.20003-C, "Medium Access Control (MAC) Standard for cdma2000 Spread Spectrum Systems", $3^{rd}$ Generation Partnership Project 2 "3GPP2", Version 2.0, Release C, Aug. 2004.

3GPP2 C.S0004-C, "Signaling Link Access Control (LAC) Standard for cdma2000 Spread Spectrum Systems", $3^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", $3^{rd}$ Generation Partnership Project 2 "3GPP2", Version 2.0, Revision c, Jul. 23, 2004.

3GPP, TS 25.321, V6.1.0, Mar. 2004, Technical Specification Group Radio Access Network, Medium Access Control (MAC) Protocol Specification (Release 6).

3GPP, TS 25.321, V6.4.0., Mar. 2005, Technical Specification Group Radio Access Network, Medium Access Control (MAC) Protocol Specification (Release 6).

3GPP, TR 25.896, V6.0.0, Mar. 2004, Technical Specification Group Radio Access Network, Feasibility Study for Enhanced Uplink for UTRA FDD (Release 6).

3GPP, TS 25.309, V6.2.0, Mar. 2005, Technical Specification Group Radio Access Network, FDD Enhanced Uplink, Stage 2 (Release 6).

3GPP, TS 25.308, V6.3.0, Dec. 2004, Technical Specification Group Radio Access Network, High Speed Downlink Packet Access (HSDPA); Stage 2 (Release 6).

3GPP, TS 25.308, V6.1.0, Mar. 2004, Technical Specification Group Radio Access Network, High Speed Downlink Packet Access (HSDPA); Stage 2 (Release 6).

Third Generation Partnership Project, "Physical Layer Standard for cdma2000 Spread Spectrum Systems", $3^{rd}$ Generation Partnership Project 2 "3GPP2", 3GPP2 C.S0002-C, Version 2.0, Revision C, Jul. 23, 2004.

Third Generation Partnership Project, "Medium Access Control (MAC) Standard for cdma2000 Spread Spectrum Systems", $3^{rd}$ Generation Partnership Project 2 "3GPP2", 3GPP2 C.20003-C, Version 2.0, Release C, Aug. 2004.

Third Generation Partnership Project, "Signaling Link Access Control (LAC) Standard for cdma2000 Spread Spectrum System", $3^{rd}$ Generation Partnership Project 2 "3GPP2", 3GPP2 C.S0004-C, Version 2.0 Revision C, Jul. 23, 2004.

Third Generation Partnership Project, "Upper Layer (Layer 3) Signaling Standard for cdma2000 Spread Spectrum Systems", $3^{rd}$ Generation Partnership Project 2 "3GPP2", 3GPP2 C.S0005-C,Version 2.0, Revision c, Jul. 23, 2004.

Third Generation Partnership Project, "Technical Specification Group Radio Access Network; High Speed Downlink Packet Access (HSDPA); Overall Description; Stage 2 (Release 5)," 3GPP TS 25.308 V5.5.0 (Mar. 2004).

Third Generation Partnership Project, "Technical Specification Group Radio Access Network; High Speed Downlink Packet Access (HSDPA); Overall Description; Stage 2 (Release 5)," 3GPP TS 25.308 V5.7.0 (Dec. 2004).

Third Generation Partnership Project, "Technical Specification Group Radio Access Network; High Speed Downlink Packet Access (HSDPA); Overall Description; Stage 2 (Release 6)," 3GPP TS 25.308 V6.3.0 (Dec. 2004).

Third Generation Partnership Project, "Technical Specification Group Radio Access Network; High Speed Downlink Packet Access (HSDPA); Overall Description; Stage 2 (Release 6)," 3GPP TS 25.308 V6.1.0 (Mar. 2004).

Third Generation Partnership Project, "Technical Specification Group Radio Access Network; FDD Enhanced Uplink; Overall Description; Stage 2 (Release 6)," 3GPP TS 25.309 V6.2.0 (Mar. 2005).

Third Generation Partnership Project, "Technical Specification Group Radio Access Network; Medium Access Control (MAC) Protocol Specification (Release 1999)," 3GPP TS 25.321 V 3.16.0 (Sep. 2003).

Third Generation Partnership Project, "Technical Specification Group Radio Access Network; Medium Access Control (MAC) Protocol Specification (Release 1999)," 3GPP TS 25.321 V 3.17.0 (Jun. 2004).

Third Generation Partnership Project, "Technical Specification Group Radio Access Network; Medium Access Control (MAC) Protocol Specification (Release 4)," 3GPP TS 25.321 V 4.9.0 (Sep. 2003).

Third Generation Partnership Project, "Technical Specification Group Radio Access Network; Medium Access Control (MAC) Protocol Specification (Release 4)," 3GPP TS 25.321 V 410.0 (Jun. 2004).

Third Generation Partnership Project, "Technical Specification Group Radio Access Network; Medium Access Control (MAC) Protocol Specification (Release 5)," 3GPP TS 25.321 V 5.8.0 (Mar. 2004).

Third Generation Partnership Project, "Technical Specification Group Radio Access Network; Technical Specification Group Radio Access Network; Medium Access Control (MAC) Protocol Specification (Release 5)," 3GPP TS 25.321 V 5.10.0 (Dec. 2004).

Third Generation Partnership Project, "Technical Specification Group Radio Access Network; Medium Access Control (MAC) Protocol Specification (Release 6)," 3GPP TS 25.321 V 6.1.0 (Mar. 2004).

Third Generation Partnership Project, "Technical Specification Group Radio Access Network; Medium Access Control (MAC) Protocol Specification (Release 6)," 3GPP TS 25.321 V 6.4.0 (Mar. 2005).

Third Generation Partnership Project, "Technical Specification Group Radio Access Network; Feasibility Study for Enhanced Uplink for UTRA FDD (Release 6)," 3GPP TR 25.896 V6.0.0 (Mar. 2004).

Chiu et al., "Comparative Downlink Shared Channel Performance Evaluation of WCDMA Release 99 and HSDPA," IEEE International Conference on Networking, Sensing, and Control, vol. 2, pp. 1165-1170 (Mar. 2004).

Third Generation Partnership Project, "Medium Access Control (MAC) Standard for cdma2000 Spread Spectrum Systems", $3^{rd}$ Generation Partnership Project 2 "3GPP2", 3GPP2 C.20003-C, Version 2.0, Release C, Aug. 2004.

Third Generation Partnership Project, "Physical Layer Standard for cdma2000 Spread Spectrum Systems", $3^{rd}$ Generation Partnership Project 2 "3GPP2", 3GPP2 C.S0002-C, Version 2.0, Revision C, Jul. 23, 2004.

Third Generation Partnership Project, "Signaling Link Access Control (LAC) Standard for cdma2000 Spread Spectrum Systems", $3^{rd}$ Generation Partnership Project 2 "3GPP2", 3GPP2 C.S0004-C, Version 2.0, Revision C, Jul. 23, 2004.

Third Generation Partnership Project, "Upper Layer (Layer 3) Signaling Standard for cdma2000 Spread Spectrum Systems", $3^{rd}$ Generation Partnership Project 2 "3GPP2", 3GPP2 C.S0005-C, Version 2.0, Revision C, Jul. 23, 2004.

Third Generation Partnership Project, "Technical Specification Group Radio Access Network; High Speed Downlink Packet Access (HSDPA); Overall Description; Stage 2 (Release 5)," 3GPP TS 25.308 V5.5.0 (Mar. 2004).

Third Generation Partnership Project, "Technical Specification Group Radio Access Network; High Speed Downlink Packet Access (HSDPA); Overall Description; Stage 2 (Release 5)," 3GPP TS 25.308 V5.7.0 (Dec. 2004).

Third Generation Partnership Project, "Technical Specification Group Radio Access Network; High Speed Downlink Packet Access (HSDPA); Overall Description; Stage 2 (Release 6)," 3GPP TS 25.308 V6.3.0 (Dec. 2004).

Third Generation Partnership Project, "Technical Specification Group Radio Access Network; High Speed Downlink Packet Access (HSDPA); Overall Description; Stage 2 (Release 6)," 3GPP TS 25.308 V6.1.0 (Mar. 2004).

Third Generation Partnership Project, "Technical Specification Group Radio Access Network; FDD Enhanced Uplink; Overall Description; Stage 2 (Release 6)," 3GPP TS 25.309 V6.2.0 (Mar. 2005).

Third Generation Partnership Project, "Technical Specification Group Radio Access Network; Medium Access Control (MAC) Protocol Specification (Release 1999)," 3GPP TS 25.321 V 3.16.0 (Sep. 2003).

Third Generation Partnership Project, "Technical Specification Group Radio Access Network; Medium Access Control (MAC) Protocol Specification (Release 1999)," 3GPP TS 25.321 V 3.17.0 (Jun. 2003).

Third Generation Partnership Project, "Technical Specification Group Radio Access Network; Medium Access Control (MAC) Protocol Specification (Release 4)," 3GPP TS 25.321 V 4.9.0 (Sep. 2003).

Third Generation Partnership Project, "Technical Specification Group Radio Access Network; Medium Access Control (MAC) Protocol Specification (Release 4)," 3GPP TS 25.321 V 410.0 (Jun. 2004).

Third Generation Partnership Project, "Technical Specification Group Radio Access Network; Medium Access Control (MAC) Protocol Specification (Release 5)," 3GPP TS 25.321 V 5.8.0 (Mar. 2004).

Third Generation Partnership Project, "Technical Specification Group Radio Access Network; Medium Access Control (MAC) Protocol Specification (Release 5)," 3GPP TS 25.321 V 5.10.0 (Dec. 2004).

Third Generation Partnership Project, "Technical Specification Group Radio Access Network; Medium Access Control (MAC Protocol Specification (Release 6)," 3GPP TS 25.321 V 6.1.0 (Mar. 2004).

Third Generation Partnership Project, "Technical Specification Group Radio Access Network; Medium Access Control (MAC) Protocol Specification (Release 6)," 3GPP TS 25.321 V 6.4.0 (Mar. 2005).

Third Generation Partnership Project, "Technical Specification Group Radio Access Network; Feasibility Study for Enhanced Uplink for UTRA FDD (Release 6)," 3GPP TR 25.896 V6.0.0 (Mar. 2004).

Asustek, "Missing gap removal in the reordering entity," 3GPP TSG-RAN WG2 Meeting #27, R2-02xxxx (Feb. 18-22, 2002).

Ericsson et al., "Hybrid ARQ text proposal for Section 7 of TR25.896," TSG-RAN WG1 #31, R1-030208 (Feb. 18-21, 2002).

Interdigital, "Forwarding of Non-consecutive Data Blocks," TSG-RAN Working Group 2 Meeting #24, TSGR2#24(01)2342 (Aug. 22-23, 2001).

Samsung, "HARQ protocol for EUDCH: some considerations," 3GPP TSG-RAN WG1 #30 Meeting, R1-030064 (Jan. 7-10, 2003).

Borgonovo et al., "MAC for WATM Air Interface: Impact of Error Control Schemes on Protocol Design," *1999 IEEE 49th Vehicular Technology Conference*, pp. 2064-2069 (May 16, 1999).

Fratta et al., "PRAS: A MAC Protocol for Wireless ATM Networks," Global Telecommunications Conference—GLOBECOM '99, XP010373448, vol. 5, pp. 2743-2751, (Dec. 5, 1999).

Gubbi, "Multimedia Streams and Quality of Service in the Next Generation Wireless Home Networks," *1999 IEEE International Workshop on Mobile Multimedia Communications, (MoMuC '99)*, pp. 232-235, (Nov. 15, 1999).

Interdigital, "MAC-hs Scheduling, Prioritization and Flow Control Aspects," TSGR2#24(101)2303, TSG-RAN Working Group 2 Meeting #24, (Aug. 22-26, 2001).

Third Generation Partnership Project; Technical Specification Group Radio Access Network; Radio Link Control (RLC) protocol specification (Release 1999) 3GPP TS 25.322 V3.16.0 (Sep. 2003).

Third Generation Partnership Project; Technical Specification Group Radio Access Network; Radio Link Control (RLC) protocol specification (Release 1999) 3GPP TS 25.322 V3.17.0 (Dec. 2003).

Third Generation Partnership Project; Technical Specification Group Radio Access Network; Radio Link Control (RLC) protocol specification (Release 4) 3GPP TS 25.322 V4.11.0 (Dec. 2003).

Third Generation Partnership Project; Technical Specification Group Radio Access Network; Radio Link Control (RLC) protocol specification (Release 4) 3GPP TS 25.322 V4.12.0 (Jun. 2004).

Third Generation Partnership Project; Technical Specification Group Radio Access Network; Radio Link Control (RLC) protocol specification (Release 5) 3GPP TS 25.322 V5.7.0 (Dec. 2003).

Third Generation Partnership Project; Technical Specification Group Radio Access Network; Radio Link Control (RLC) protocol specification (Release 5) 3GPP TS 25.322 V5.10.0 (Mar. 2005).

Third Generation Partnership Project; Technical Specification Group Radio Access Network; Radio Link Control (RLC) protocol specification (Release 6) 3GPP TS 25.322 V6.0.0 (Dec. 2003).

Third Generation Partnership Project; Technical Specification Group Radio Access Network; Radio Link Control (RLC) protocol specification (Release 6) 3GPP TS 25.322 V6.3.0 (Mar. 2005).

Third Generation Partnership Project; Technical Specification Group Radio Access Network; High Speed Downlink Packet Access; Overall UTRAN Description (Release 5) 3GPP TR 25.855 V5.0.0 (Sep. 2001).

* cited by examiner

US 8,018,945 B2

METHOD AND APPARATUS FOR FORWARDING NON-CONSECUTIVE DATA BLOCKS IN ENHANCED UPLINK TRANSMISSIONS

CROSS REFERENCE TO RELATED APPLICATION

This application claims the benefit of U.S. Provisional Application No. 60/566,588 filed Apr. 29, 2004, which is incorporated by reference as if fully set forth.

FIELD OF INVENTION

The present invention is related to a wireless communication system including a wireless transmit/receive unit (WTRU), at least one Node-B and a radio network controller (RNC). More particularly, the present invention is related to a method and system for forwarding non-consecutive data blocks in enhanced uplink (EU) transmissions.

BACKGROUND

Methods for improving uplink (UL) coverage, throughput and transmission latency are being investigated in Release 6 (R6) of the 3rd generation partnership project (3GPP). In order to successfully implement these methods, scheduling and assigning of UL physical resources have been moved from the RNC to the Node-B such that the Node-B can make decisions and manage UL radio resources on a short-term basis more efficiently than the RNC, even if the RNC retains overall control over the Node-B.

One or more independent UL transmissions are processed on an enhanced dedicated channel (E-DCH) between a WTRU and a universal mobile telecommunication system (UMTS) terrestrial radio access network (UTRAN) within a common time interval. One example of this would be a medium access control (MAC) layer hybrid-automatic repeat request (H-ARQ) or a simple MAC layer ARQ operation where each individual transmission may require a different number of retransmissions to be successfully received by the UTRAN. This operation may result in a loss of transmission sequence at the MAC layer.

In-sequence data delivery is required by the radio link control (RLC) layer for proper operation. A re-ordering function is needed to organize the received data blocks according to the sequence generated by the WTRU RLC entity. In the prior art, a data-forwarding timer, (called a T1 timer in high speed downlink packet access (HSDPA)), has been utilized for delivery of non-consecutive data blocks to higher layers. The timer is initialized when data blocks which have been correctly received cannot be delivered to the higher layers due to non-sequential reception. When the timer expires, all data blocks in the re-ordering buffer up to the next non-sequentially received data block are forwarded to higher layers.

It is difficult to properly set duration for the data forwarding timer since, even in normal operation, cell congestion occasionally generates relatively long periods between transmissions. In addition, since out-of-sequence delivery to RLC acknowledged mode (AM) may result in unnecessary retransmissions, the worst case delay must be considered in setting the data forwarding timer for proper operation. Since transmission errors are unavoidable, this timer mechanism results in increased and potentially unacceptable latency in performing RLC retransmission procedures.

In order to maintain quality of service (QoS), transmissions should not be unnecessarily delayed in providing sequential delivery. The timer mechanism is not efficient to provide proper QoS. If the duration of the timer is too short, out of sequence transmissions may be incorrectly perceived when only a particular transmission has been delayed, resulting in unnecessary requests for RLC retransmissions or potential release of the channel. If the duration of the timer is too long, detection and recovery of failed transmissions is delayed, resulting in greater difficulty in achieving low transmission latency QoS requirements. Determining the duration of the out of sequence forwarding timer is further complicated by relatively large variances in retransmission scheduling.

SUMMARY

The present invention is related to a method and apparatus for forwarding non-consecutive data blocks in EU transmissions. A WTRU and one or more Node-Bs include one or more ARQ/H-ARQ processes for supporting EU transmissions. Data blocks transmitted by the WTRU are re-ordered in a re-ordering entity located in the Node-B(s) or an RNC. Once a missing data block is identified, a data forwarding timer in the Node-B(s) or RNC is initiated and subsequent WTRU transmissions are monitored to determine whether the missing data block has been discarded by the WTRU. Upon recognition of the discard of the missing data block, the non-consecutive data blocks are forwarded to higher layers.

In an absolute priority scheme, a higher priority data block is always serviced before a lower priority data block, and a data block with the earliest transmission sequence number (TSN) is serviced first within the same priority data blocks. In such a mechanism, the Node-B may recognize that the WTRU has discarded the missing data block if all H-ARQ processes available and active for the WTRU at the Node-B have received successfully either: 1) a new transmission with the same priority and a higher TSN compared to the missing data block; or 2) a new transmission with a lower priority compared to the missing data block.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1A:
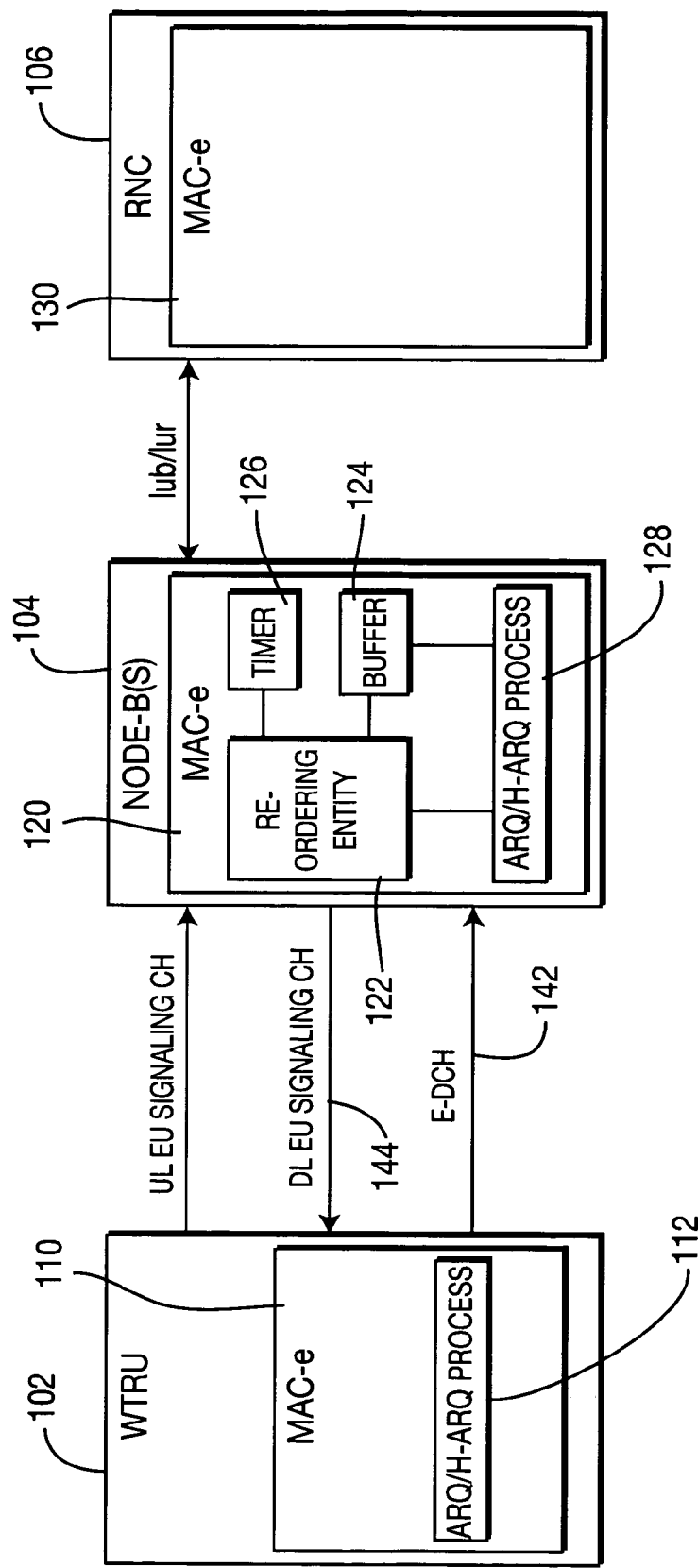
FIG. 1A is a block diagram of a wireless communication system including one or more Node-Bs with a data re-ordering entity in accordance with one embodiment of the present invention.

FIG. 1A is a block diagram of a wireless communication system 100 including one or more Node-Bs with a data re-ordering entity 122 in accordance with one embodiment of the present invention. The system 100 includes a WTRU 102, one or more Node-Bs 104 and an RNC 106. The WTRU 102 transmits enhanced dedicated channel (E-DCH) data through an assigned E-DCH 142. The Node-B(s) 104 transmits either an acknowledgement (ACK) message or a non-acknowledgement (NACK) message through the DL EU signaling channel 144, depending on the success or failure of decoding the data at the Node-B(s) 104 using an H-ARQ or simple ARQ operation, as indicated by ARQ/H-ARQ process 112 and 128 in the WTRU 102 and Node-B(s) 104, respectively.

Referring to FIG. 1A, new MAC entities 110, 120, 130 for EU transmissions, (i.e., MAC-e entities), are included in each of the WTRU 102, the Node-B(s) 104 and the RNC 106, respectively. The MAC-e entity 120 of the Node-B(s) 104 includes a re-ordering entity 122, data re-ordering buffer 124, a data forwarding timer 126 for in-sequence delivery of the data blocks, respectively. The data transmitted by the WTRU 102 over the E-DCH 142 is re-ordered by the re-ordering entity 122 before being forwarded to a higher layer. The re-ordering entity 122 receives data blocks, (MAC-e protocol data units (PDUs)), and delivers the MAC-e PDUs with consecutive TSNs to a higher layer. MAC-e PDUs that are not consecutive, (i.e., resulting in a missing data block), are not delivered to the higher layer until expiration of the data forwarding timer 126. The re-ordering entity 122 uses the knowledge of the ARQ/H-ARQ process 128 to determine whether the missing data block has been discarded by the WTRU 102 and to forward non-consecutive data blocks to higher layers.

Figure 1B:
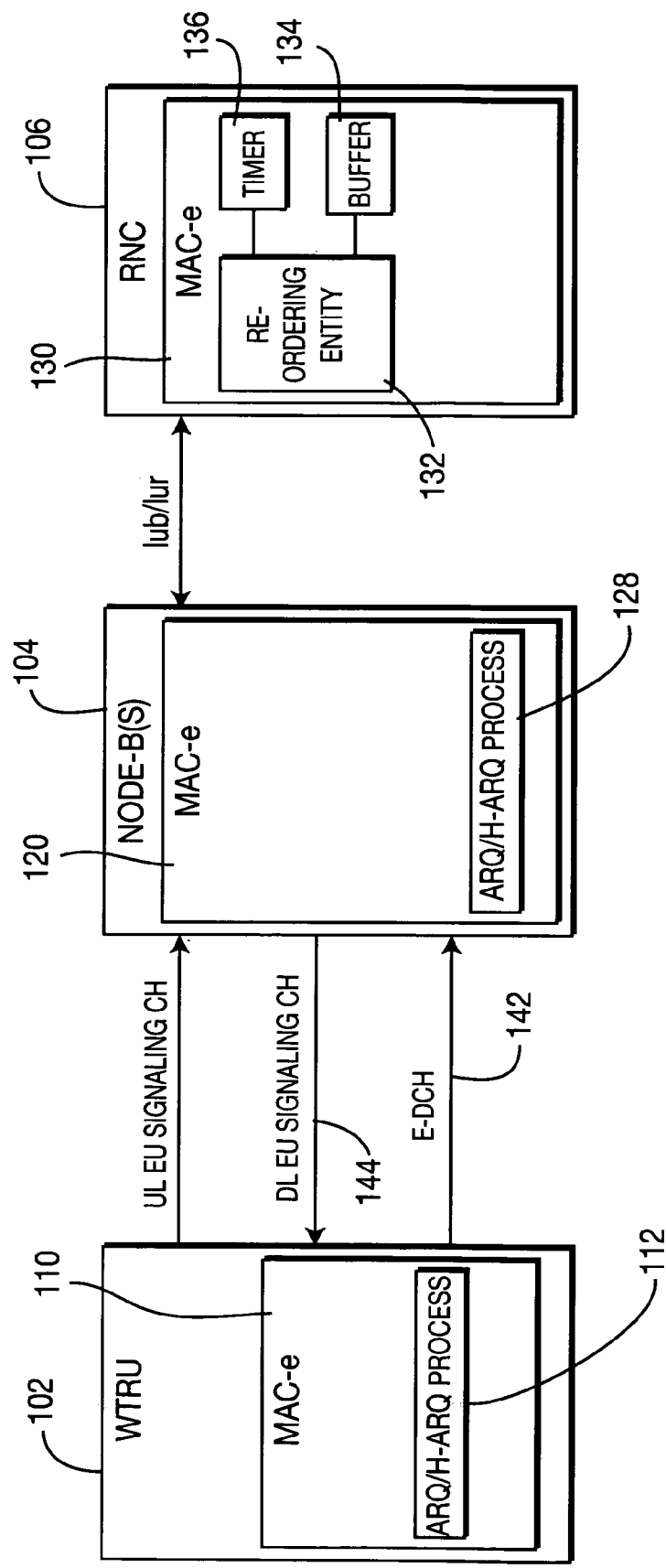
FIG. 1B is a block diagram of a wireless communication system including an RNC with a data re-ordering entity in accordance with another embodiment of the present invention.

FIG. 1B is a block diagram of a wireless communication system 150 including an RNC with a data re-ordering entity 132 operating in accordance with another embodiment of the present invention. The system 150 also includes a WTRU 102, one or more Node-Bs 104 and an RNC 106, similar to the system 100 of FIG. 1A. However, instead of the Node-B(s) 104 including a re-ordering entity 122, the MAC-e entity 130 of the RNC 106 includes a re-ordering entity 132, a re-ordering buffer 134 and a data forwarding timer 136 for in-sequence delivery of the data blocks, respectively. Data transmitted by the WTRU 102 over the E-DCH 142 is re-ordered by the re-ordering entity 132 before being forwarded to a higher layer. Via the Node-B(s) 104, the re-ordering entity 132 receives data blocks, (MAC-e protocol data units (PDUs)), and delivers the MAC-e PDUs with consecutive TSNs to a higher layer. MAC-e PDUs that are not consecutive are not delivered to the higher layer until expiration of the data forwarding timer 136. The re-ordering entity 13 uses the knowledge of the ARQ/H-ARQ process 128 in the Node-B(s) 104 to determine whether the missing data block has been discarded by the WTRU 102 and to forward non-consecutive data blocks to higher layers.

The H-ARQ process assignment mechanism is preferably based on absolute priority of data blocks. After recognizing that a data block of a particular transmission sequence number (TSN) is missing in the re-ordering buffer in the UTRAN, (i.e., either a Node-B or an RNC), the re-ordering entity 122, 132 determines the missing data block is lost if subsequent to detection of the missing data block all ARQ/H-ARQ processes 128 available and active within the Node-B(s) 104 for that WTRU 102 have either: 1) a new transmission initiated for a transmission with the same priority class with a higher sequence number; or 2) a new transmission initiated for a transmission with a lower priority class. In such case, the re-ordering entity 122, 132 determines that the data block is lost at the MAC layer and forwards the non-consecutive data blocks to higher layers.

Figure 2:
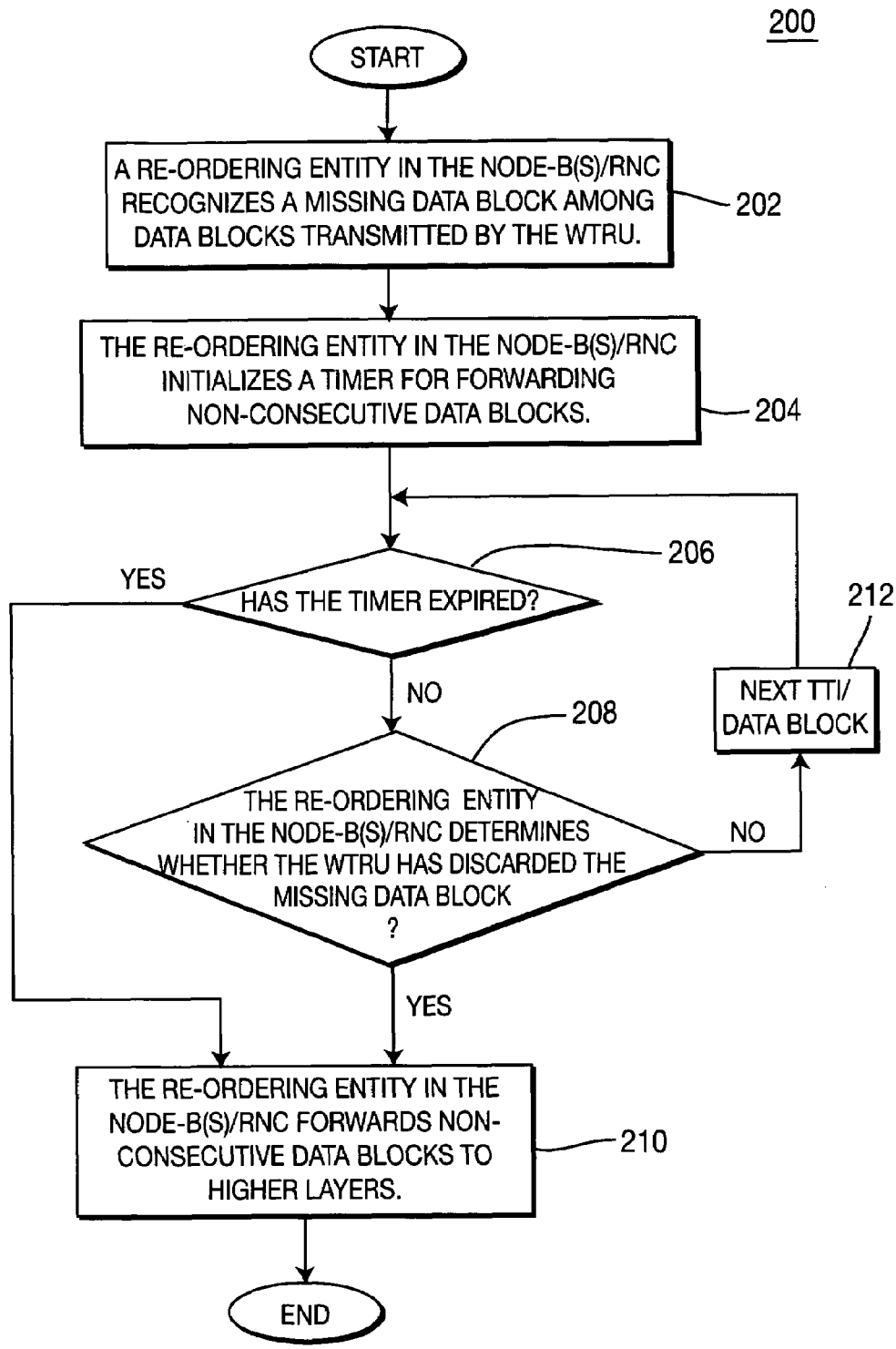
FIG. 2 is a flow diagram of a process for forwarding non-consecutive data blocks using either of the systems of FIGS. 1A and 1B.

FIG. 2 is a flow diagram of a process 200 for forwarding non-consecutive data blocks in accordance with one embodiment of the present invention. The process 200 may be implemented using either the configuration of system 100 of FIG. 1A or system 150 of FIG. 1B. The Node-B(s) 104 maintains a finite number of ARQ/H-ARQ processes 128 for each WTRU 102. The re-ordering entity 132 in the RNC 106 may not have knowledge about the H-ARQ operation in the WTRU 102 and the Node-B(s) 104. Therefore, when the configuration of system 150 shown in FIG. 1B is used, the Node-B(s) 104 provide necessary information to the RNC 106 for enabling the re-ordering entity 132 to determine whether the WTRU 102 has discarded the missing data block.

The Node-B(s) 104 or RNC 106 receives data blocks from the WTRU 102 and correctly decoded data blocks are rearranged in sequence in a re-ordering buffer 124 of the Node-B(s) 104 or the re-ordering buffer 134 of the RNC 106. When the configuration of system 150 is used, the Node-B(s) 104 forwards the successfully decoded data block to the RNC 106 along with the H-ARQ process ID and/or the frame number when the transmission was received. The frame number may be either the frame when the NDI is received or the frame when the successful transmission occurred.

The re-ordering entity 122 of the Node-B(s) 104 or the re-ordering entity 132 of the RNC 106 recognizes a missing data block utilizing a TSN (step 202). A unique TSN is assigned to each data block by the WTRU 102. Upon recognition of the missing data block, the Node-B(s) 104 initializes the data forwarding timer 126 or the RNC initializes the data forwarding timer 136 (step 204). The re-ordering entity 122 or 132 determines whether the data forwarding timer 126 or 136, respectively, has expired (step 206). If the timer 126 or 136 has expired, the re-ordering entity 122 or 132 forwards non-consecutive data blocks to higher layers (step 210), and a higher layer data recovery procedure is initiated.

If the data forwarding timer 126 or 136 has not expired, the re-ordering entity 122 or 132 further determines whether the missing data block has been discarded by the WTRU 102 based on a known H-ARQ process assignment mechanism at the WTRU 102 (step 208). When the RNC 106 determines a discarded data block in step 208, the H-ARQ process may be determined implicitly from the frame number the transmission was received in. Following an out-of-sequence reception based on rules for H-ARQ process assignment and the subsequent assignment of H-ARQ processes, the Node-B(s) 104 or the RNC 106 can determine when the WTRU 102 discarded the particular transmission.

The H-ARQ process assignment mechanism at the WTRU 102 is preferably based on absolute priority of the data blocks, even though other mechanisms may be implemented. In an absolute priority scheme, a higher priority data block is always serviced before a lower priority data block, and a data block with the earliest TSN is serviced first within the same priority data blocks. In such a mechanism, the Node-B(s) 104 or the RNC 106 may recognize that the WTRU 102 has discarded the missing data block if all ARQ/H-ARQ processes 128 available and active for the WTRU 102 at the Node-B(s) 104 have received successfully either: 1) a new transmission with the same priority and a higher TSN compared to the missing data block; or 2) a new transmission with a lower priority compared to the missing data block.

Alternatively, the Node-B(s) 104 or RNC 106 may recognize that the WTRU 102 has discarded the missing data block if the H-ARQ process which is associated with the lost data has successfully received either: 1) a new transmission with the same priority and a higher TSN compared to the missing data block; or 2) a new transmission with a lower priority compared to the missing data block. The H-ARQ process may be known by the time of transmission/reception. The time may be indicated as either a frame or subframe number.

If either condition is met, the Node-B(s) 104 or RNC 106 determines at the MAC layer that the missing data block has been discarded by the WTRU 102. Then, the re-ordering entity 122 or 132 forwards the non-consecutive data blocks to the higher layer without waiting for expiration of the data forwarding timer 126 or 136. If neither condition is met, the Node-B(s) 104 or RNC 106 determines that the missing data block has not been discarded, the process 200 proceeds to step 212 to wait for the next TTI or data block, and the process 200 then returns to step 206.

New transmissions may be realized by the Node-B(s) 104 by receiving of a new data indicator (NDI). NDI is used to indicate whether a transmission is new data or old data (re-transmission). For old data, some kind of combining can be done at the Node-B(s) 104. An NDI may also be represented by an H-ARQ process transmission counter. When the H-ARQ process transmission is set to an initial value, this represents the NDI. New transmissions may also be determined by received transmission queue identities (IDs) and the TSN following decoding.

The Node-B(s) 104 may support several re-ordering queues for each WTRU 102, and the out of sequence detection and forwarding logic may operate independently for each re-ordering queue.

In another embodiment, the H-ARQ process assignment mechanism at the WTRU 102 is associated with the lost data block. In an absolute priority scheme, a higher priority data block is always serviced before a lower priority data block, and a data block with the earliest TSN is serviced first within the same priority data blocks. In such a mechanism, the Node-B(s) 104 may recognize that the WTRU 102 has discarded the missing data block if all ARQ/H-ARQ processes 128 available and active for the WTRU 102 at the Node-B(s) 104 have received successfully either: 1) a new transmission with the same priority and a higher TSN compared to the missing data block; or 2) a new transmission with a lower priority compared to the missing data block.

If either condition is met, the Node-B(s) 104 determines at the MAC layer that the missing data block has been discarded by the WTRU 102, then the re-ordering entity 122 forwards the non-consecutive data blocks to the higher layer not waiting for expiration of the data forwarding timer 126. If neither condition is met, the Node-B(s) 104 determines that the missing data block has not been discarded, the process 200 proceeds to step 212 to wait for the next TTI in the case of the Node-Bs 104 or, in the case of the RNC 106, the next data block. The process 200 returns to step 206 after the next TTI occurs or the next data block is received.

New transmissions may be realized by the Node-B(s) 104 by receiving of a new data indicator (NDI). The NDI may be used to allow for H-ARQ chase combining in the Node-B(s) 104. New transmissions may also be determined by received transmission queue identities (IDs) and the TSN following decoding.

Figure 3:
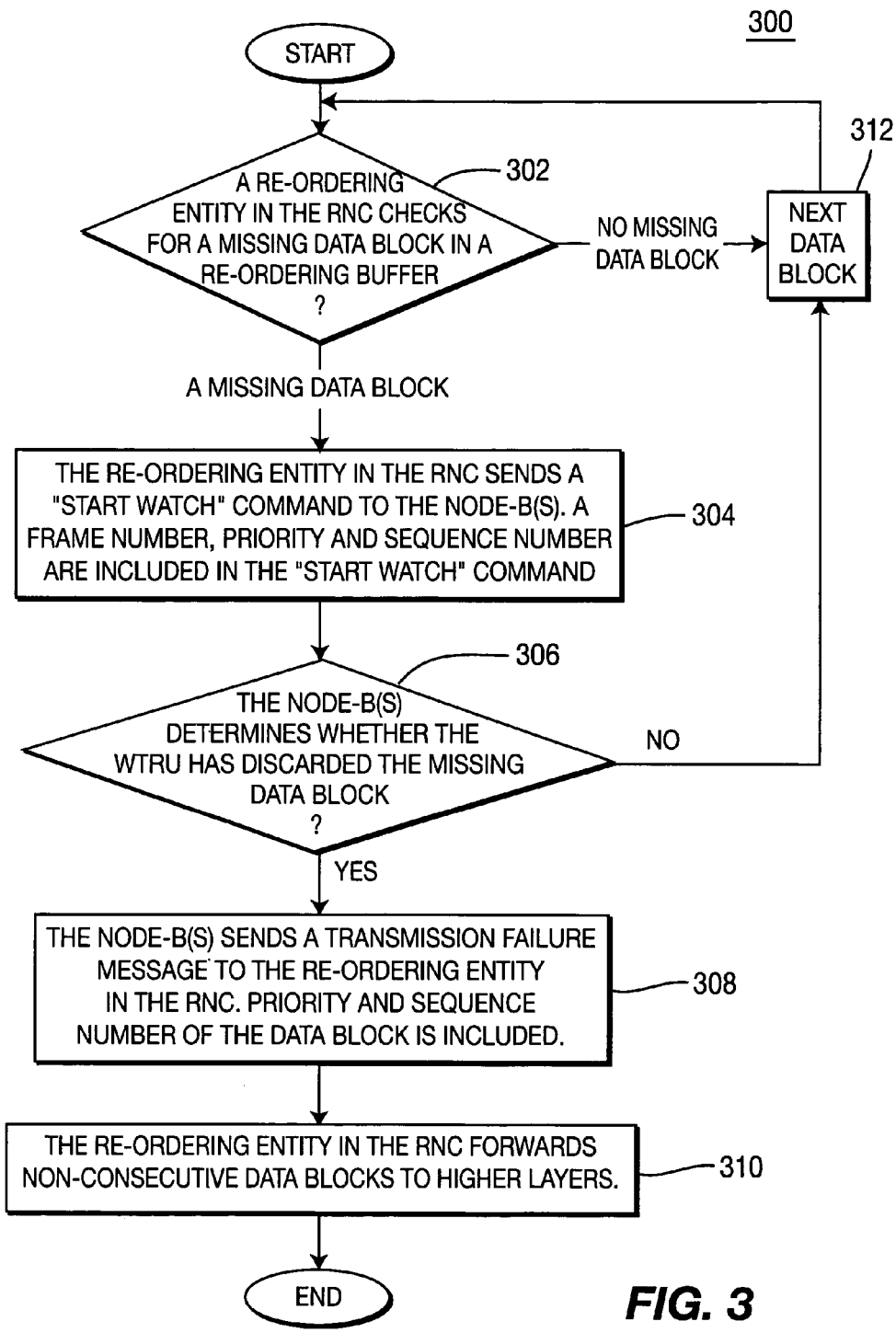
FIG. 3 is a flow diagram of a process for forwarding non-consecutive data blocks using the system of FIG. 1B.

FIG. 3 is a flow diagram of a process 300 for forwarding non-consecutive data blocks in accordance with a third embodiment of the present invention. In this embodiment, the RNC 106 notifies the Node-B(s) 104 that there is a missing data block and the Node-B(s) 104 detects whether the WTRU 102 has discarded the missing data block and reports it to the RNC 106.

A re-ordering entity 132 in the RNC 106 checks whether there is a missing data block in the re-ordering buffer 134 (step 302). If there is no missing data block, the process 300 proceeds to step 312 to wait for the next received data block. If there is a missing data block, the re-ordering entity 132 initializes a data forwarding timer 136 and sends a "start watch" command to the Node-B(s) 104 (step 304). The frame number originally reported by the Node-B(s) 104 when the out-of-sequence data block in the re-ordering buffer 134 is recognized and the priority and sequence number of the missing data block are also included in the "start watch" command.

After receiving the start watch command from the RNC 106, the Node-B(s) 104 checks its current database to check all data blocks subsequent to the frame number indicated by the RNC 106 and monitors subsequent transmissions in order to determine whether the WTRU 102 has discarded the missing data block based on the known H-ARQ process assignment mechanism at the WTRU 102 (step 306). As explained hereinabove, the ARQ/H-ARQ processes 112 are preferably assigned in accordance with an absolute priority scheme. In such case, the Node-B(s) 104 determines whether all ARQ/H-ARQ processes 128 available and active for the WTRU 102 within the Node-B(s) 104 have either 1) a new transmission with the same priority but with a higher TSN compared to the missing data block or 2) a new transmission data block with a lower priority compared to the missing data block.

If either condition is met, the Node-B(s) 104 sends a transmission failure message to the re-ordering entity 132 in the RNC 106 via E-DCH frame protocol (step 308). In the transmission failure message, the priority, which indicates the re-ordering queue ID, and sequence number of the data block is also included. The Node-B(s) 104 then stops watching for such an event. If neither condition is met, the process 300 proceeds to step 312 to wait for the next received data block.

Upon receiving the transmission failure message, the re-ordering function in the RNC 106 forwards the non-consecutive data blocks to higher layers before the timer expires (step 310).

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. A method of receiving uplink data by a wireless network device, the method comprising:

receiving uplink signals using at least one hybrid automatic repeat request (HARQ) entity of a wireless network device;

sending, by the wireless network device using at least one HARQ entity, positive acknowledgement messages or negative acknowledgement messages over a downlink signaling channel in response to the received uplink signals;

recovering protocol data units (PDUs) by the wireless network device from the received uplink signals;

storing the recovered PDUs in at least one reordering buffer of the wireless network device;

starting a timer of the wireless network device in response to identifying an out-of-order PDU based on at least sequence numbers of the recovered PDUs; and on a condition that a missing PDU is not recovered before the timer expires, delivering by the wireless network device at least one recovered PDU to higher layers in response to the timer expiring.

2. The method of claim 1 wherein the wireless network device is a Node-B.

3. The method of claim 1 wherein the recovered PDUs are medium access control (MAC) or radio link control (RLC) PDUs.

4. The method of claim 1 wherein the at least one reordering buffer is associated with a radio link control (RLC) entity.

5. A wireless network device for receiving uplink data, the wireless network device comprising:

circuitry configured to receive uplink signals using at least one hybrid automatic repeat request (HARQ) entity; wherein the circuitry is further configured to send, using the at least one HARQ entity, positive acknowledgement messages or negative acknowledgement messages over a downlink signaling channel in response to the received uplink signals; wherein the circuitry is further configured to recover protocol data units (PDUs) from the received uplink signals and to store the recovered PDUs in at least one reordering buffer; wherein the circuitry is further configured to start a timer in response to identifying an out-of-order PDU based on at least sequence numbers of the recovered PDUs; and the circuitry is further configured on a condition that a missing PDU is not recovered before the timer expires, to deliver at least one PDU to higher layers in response to the timer expiring.

6. The wireless network device of claim 5 wherein the wireless network device is a Node-B.

7. The wireless network device of claim 5 wherein the recovered PDUs are medium access control (MAC) or radio link control (RLC) PDUs.

8. The wireless network device of claim 5 wherein the at least one reordering buffer is associated with a radio link control (RLC) entity.

* * * * *

UNITED STATES PATENT AND TRADEMARK OFFICE
CERTIFICATE OF CORRECTION

PATENT NO. : 8,018,945 B2
APPLICATION NO. : 11/095912
DATED : September 13, 2011
INVENTOR(S) : Zhang et al.

It is certified that error appears in the above-identified patent and that said Letters Patent is hereby corrected as shown below:

ON THE TITLE PAGE

At Section (56) OTHER PUBLICATIONS, page 2, left column, (line 3), before "2 "3GPP2", 3GPP2 C.20003-C,", delete "Prokect" and insert --Project--.

At Section (56) OTHER PUBLICATIONS, page 3, left column, (line 62), after "3GPP TS 25.321 V 3.17.0 (Jun.", delete "2003)" and insert --2004)--.

At Section (56) OTHER PUBLICATIONS, page 3, right column, (line 27), after "TSGR2#24(01)2342 (Aug.", delete "22-23" and insert --22-26--.

At Section (56) OTHER PUBLICATIONS, page 3, right column, (line 71), after "TR 25.855 V5.0.0 (Sep. 2001).", insert:

--THIRD GENERATION PARTNERSHIP PROJECT; Technical Specification Group Radio Access Network; UE Radio Access capabilities (Release 1999) 3GPP TS 25.306 V3.10.0 (December 2003).

THIRD GENERATION PARTNERSHIP PROJECT; Technical Specification Group Radio Access Network; UE Radio Access capabilities (Release 4) 3GPP TS 25.306 V4.9.0 (December 2003).

THIRD GENERATION PARTNERSHIP PROJECT; Technical Specification Group Radio Access Network; UE Radio Access capabilities (Release 4) 3GPP TS 25.306 V4.10.0 (March 2005).

THIRD GENERATION PARTNERSHIP PROJECT; Technical Specification Group Radio Access Network; UE Radio Access capabilities (Release 5) 3GPP TS 25.306 V5.8.0 (March 2004).

Signed and Sealed this
Twenty-eighth Day of August, 2012

David J. Kappos
*Director of the United States Patent and Trademark Office*

THIRD GENERATION PARTNERSHIP PROJECT; Technical Specification Group Radio Access Network; UE Radio Access capabilities (Release 5) 3GPP TS 25.306 V5.10.0 (March 2005).

THIRD GENERATION PARTNERSHIP PROJECT; Technical Specification Group Radio Access Network; UE Radio Access capabilities (Release 6) 3GPP TS 25.306 V6.1.0 (March 2004).

THIRD GENERATION PARTNERSHIP PROJECT; Technical Specification Group Radio Access Network; UE Radio Access capabilities (Release 6) 3GPP TS 25.306 V6.4.0 (March 2005).--.